Figure 1:
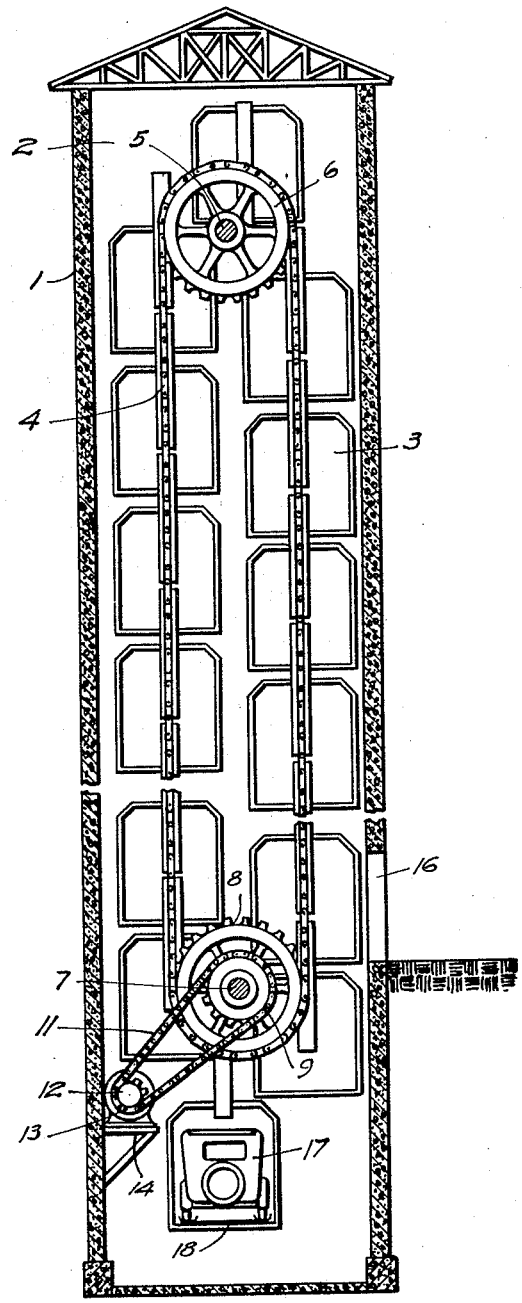

July 7, 1931.   W. S. RUGG   1,813,203
GARAGE ELEVATOR
Filed April 11, 1929   3 Sheets-Sheet 2
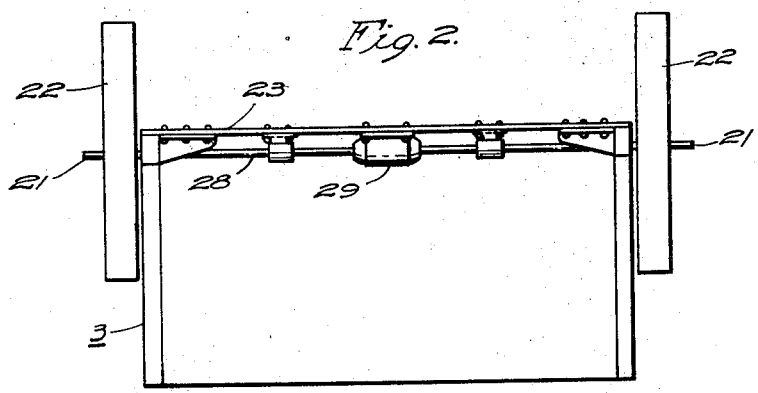
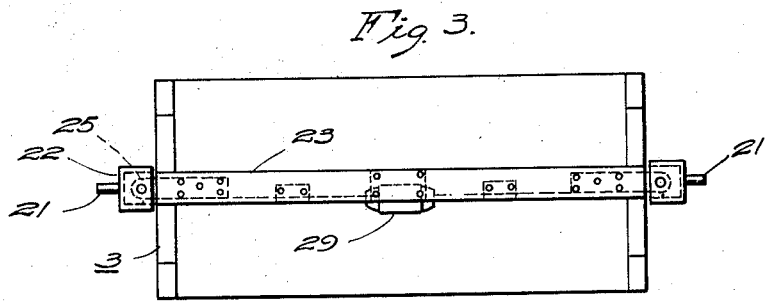
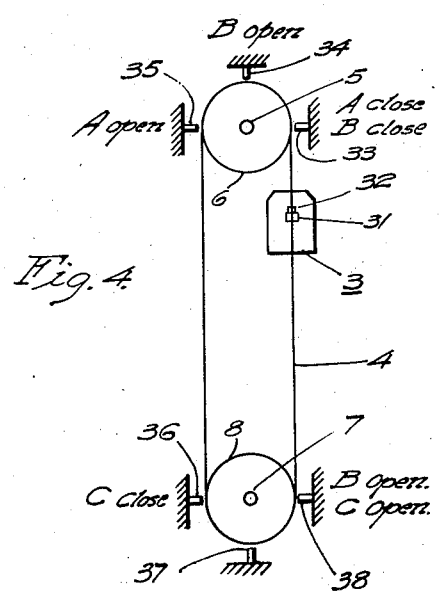
INVENTOR
Walter S. Rugg.
BY
ATTORNEY July 7, 1931.　　　W. S. RUGG　　　1,813,203
GARAGE ELEVATOR
Filed April 11, 1929　　　3 Sheets-Sheet 3
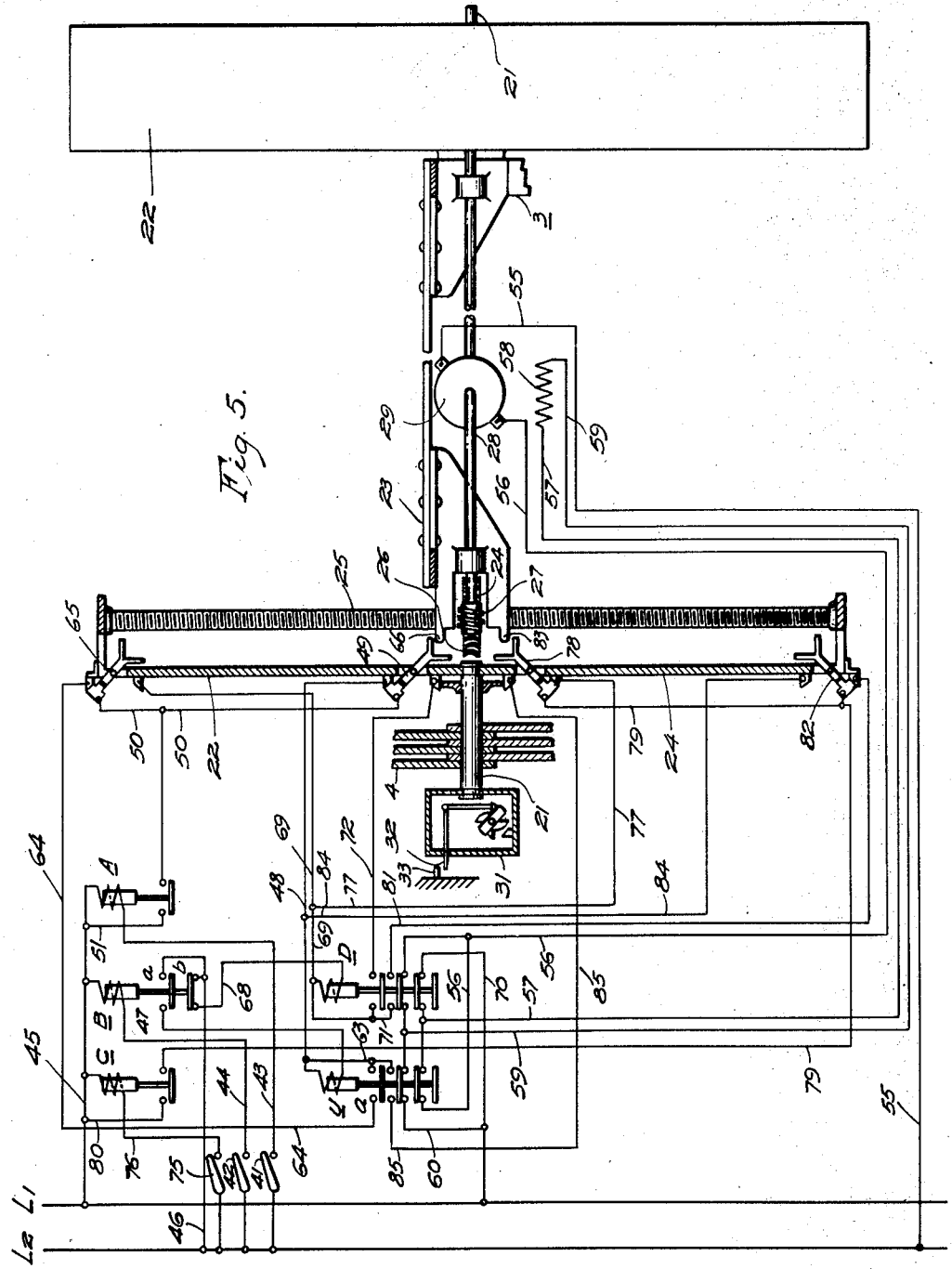
INVENTOR
Walter S. Rugg.
BY
ATTORNEY Patented July 7, 1931

1,813,203

UNITED STATES PATENT OFFICE

WALTER S. RUGG, OF PITTSBURGH, PENNSYLVANIA, ASSIGNOR TO WESTINGHOUSE ELECTRIC & MANUFACTURING COMPANY, A CORPORATION OF PENNSYLVANIA

GARAGE ELEVATOR

Application filed April 11, 1929. Serial No. 354,241.

My invention relates in general, to conveyor systems and more particularly to conveyor-storage devices for such articles as motor vehicles.

An object of my invention is to provide a conveyor comprising a plurality of containers which are disposed as closely together as possible in order to efficiently utilize the available space.

A further object of my invention is to provide a conveyor system having a plurality of containers that are mounted in such manner that they may be moved relative to each other while the conveyor is in operation.

A more specific object of the invention is to provide means for moving the containers of a conveyor system relative to each other in order that clearance space may be made available between adjacent containers for the purpose of negotiating such curves in the conveyor system as ordinarily occur at the top and at the bottom of a conveyor of the usual type.

It has been proposed to utilize conveyor mechanisms for storing motor vehicles in congested areas in order that the ground area may be utilized in the most efficient manner. Such proposed systems have usually embodied a plurality of vertically disposed conveyor systems comprising endless flexible elements, such as conveyor chains, upon which are suspended a plurality of storage platforms or containers in such manner that they are held in upright positions by the force of gravity at all times. However, because of the fact that it is necessary for the containers to turn about their axes of suspension during the transition period, while passing from the ascending column of the conveyor to the descending column, a relatively large clearance space is necessarily provided between adjacent containers, in a conveyor system of the usual type.

In accordance with the present invention, I have provided a conveyor system in which the adjacent containers are disposed closely together, and means are provided for increasing the clearance space between the containers when such action becomes necessary or desirable.

The foregoing and other objects of my invention may be readily appreciated upon studying the following detailed specification in conjunction with the accompanying drawings, in which Figure 1 is a view, partially in elevation and partially in section, of an automobile parking garage to which my invention is applicable, Fig. 2 is a view, in side elevation, of a portion of an automobile container showing the means for suspending the container in the conveyor system, Fig. 3 is a plan view of the container shown in Fig. 2, Fig. 4 is a diagrammatic showing of a conveyor system having stops for operating a control system, and Fig. 5 is an enlarged view, in elevation, of the mechanism for moving a container relative to the conveyor chain and a schematic diagram of the electrical control system for operating the mechanism.

The automobile parking garage which is illustrated in Fig. 1 comprises a structure or building 1 of any suitable material and construction that encloses vertical shaft 2 in which are suspended a plurality of containers or supporting platforms 3 that are disposed in two vertical columns and suspended in position by means of endless chains 4 or other suitable flexible members. The entire conveyor system, including the containers and the endless chains, is supported by a shaft 5 that is journalled in the sides of the structure 1, in a substantially horizontal position near its upper end and is provided with two relatively large sprocket wheels or sheaves 6 for receiving the endless chains 4.

As illustrated in Fig. 1, only one sprocket wheel 6 and a cooperating chain 4 are shown, but it will be readily understood that a similar sprocket wheel and chain are provided for supporting the opposite ends of the containers 3 which are not visible in the drawings.

For furnishing the means to move the conveyor system, the lower portion of the building 1 is provided with a transverse shaft 7 that is similar to, and disposed parallel with, the shaft 5 at the upper end of the building.

For engaging the chain 4, the shaft 7 is provided with a pair of sprocket wheels 8 that are similar to the sprocket wheels 6 and are disposed within the lower bights of the endless chains 4. The shaft 7 is further provided with a sprocket wheel 9 of smaller diameter to be driven by a chain or belt 11 that passes over a sprocket wheel 12 a driving motor 13 which is disposed on a suitable platform 14 near the bottom of the elevator shaft 2.

When the conveyor is being utilized in the normal manner for storing motor vehicles, any one of the containers 3 may be brought opposite an opening 16 in one of the side walls of the structure 1 for the purpose of receiving a load, such as an automobile 17, to be stored. As illustrated in the container which is disposed nearest the bottom of the shaft 2 in Fig. 1, the automobile 17 is mounted upon a loading truck or dolly 18 by means of which it may be moved sidewise through the opening 16 upon the platform of a container 3.

In order that the containers 3 may be supported in upright positions at all times, they are severally suspended from the endless chains 4 by means of a pair of trunnions 21 which are best shown in Figs. 2 and 3. Since the trunnions 21 are disposed at points on the sides of the containers 3 that are well above their centers of gravity the force of gravity will normally hold them in upright positions, regardless of the position of the endless chains 4.

As shown in Fig. 1, the adjacent containers 3 are disposed as close as possible in the vertical columns in order that the available space may be used to the greatest advantage in storing vehicles. However, it may readily be seen that, inasmuch as the trunnions 21 move in accordance with the speed of the conveyor chains 4, when the chains pass around either the sprocket wheels 6 or the sprocket wheels 8, a horizontal component of motion of the corresponding container 3 is introduced which necessarily reduces the vertical component of motion in accordance with the sine of the angle between a horizontal line and a radial line on the sprocket wheels 6 or 8 which passes through the center of the trunnions 21.

It is obvious that, in order to prevent interference between adjacent containers 3, the vertical component of motion of the particular container 3 which happens to be passing around a bight in the chains 4 must be maintained equal to, or greater than, the vertical motion of the next adjacent container. To accomplish this result, I have provided separate means on each of the containers 3 for moving it in a vertical direction relative to the trunnions 21 in such manner that all possibility of interference between containers during the transition period from one vertical column to the other is entirely avoided.

As shown in Figs. 2, 3, and 5 the trunnions 21, by means of which the containers 3 are supported upon the chains 4, are each rigidly secured to vertically disposed guide members 22 of substantially U-shape in cross section, within which the ends of a cross member 23, that constitutes the top portion of the container 3, are disposed to be moved in a vertical direction. The ends of the cross member 23 are bifurcated in such manner that nuts 24 may be disposed, in a substantially horizontal plane, between fork members. The nuts 24 are threaded upon screw threaded shafts 25 that are rigidly secured to the respective guide members 22 in such manner that, when the nuts 24 are turned, the bifurcated ends of the cross member 23 may be caused to move within the guides 22. The outside surface of the nuts 24 are provided with worm gear teeth 26 which are engaged by worms 27 on the ends of an operating shaft 28 that constitutes an extension of the armature shaft of a driving motor 29 which is suspended from the cross member 23 at substantially the center of the container 3 and is disposed to operate the nuts 24 within the guide members 22 at both ends of the container 3 simultaneously.

Referring now to Fig. 5, power for operating the motor 29 may be taken from line conductors L1 and L2 which are connected to each of the containers 3 by any well known means for transmitting electricity to a movable object such, for instance, as a trailing cable or slip ring and brush mechanism (not shown).

In order that the motor 29 may operate to move the container 3 in the proper direction and at the proper time, a control system is provided that comprises a drum controller or ratchet switch 31 of any suitable construction that is carried by one of the chains 4 at a position adjacent to the corresponding trunnion 21 of the container 3. As shown, the controller 31 is provided with a projecting operating lever 32 which is disposed to engage any one of a plurality of stationary stop members 33, 34 and 35 at the upper portion of the elevator shaft and similar stationary stop members 36, 37 and 38 in the lower portion of the shaft, as shown diagrammatically in Fig. 4.

If we now consider a container 3 to be ascending in the right-hand column of containers as shown in Figs. 1 and 4, and approaching the top of the shaft 2, the operating lever 32 of the controller 31 will first engage the stationary stop 33, which is substantially in a horizontal plane occupied by the supporting shaft 5.

Referring to the control diagram of Fig. 5, the controller 31, when engaged by the stationary stop 33, will be so operated as to close switches 41 and 42 that connect conductors 43 and 44, respectively, to the line conductor L2. Current from the line conductor L2 may then flow through conductors 43 and 44 to the operating coils of relays A and B, respectively, and thence, by means of a conductor 45, to the line conductor L1, thereby causing the relays A and B to be moved to their closed positions.

With the relays A and B in their closed positions, a circuit may be traced from the line conductor L2, through a conductor 46, which is connected by the upper contact members of the relay B, to a conductor 47, from which the circuit leads through the operating coil of a reversing switch U, to a conductor 48 that leads to the upper contact members of a mid-position limit switch 49 and thence, by a conductor 50, which is connected to a conductor 51 by the relay A, to the conductor 45 and to the line conductor L1. When the operating coil of the reversing switch U is thus energized, a circuit is completed from the line conductor L2, through a conductor 55, to the armature of the motor 29, and thence, by a conductor 56 which is connected, by the lower contact members on the reversing switch U, to a conductor 57 which includes the field winding 58 of the motor 29 from which current flows through a conductor 59 which is connected, by a second pair of contact members on the reversing switch U, to a conductor 60 that completes the circuit to the line conductor L1. When the operating circuit is thus established for the motor 29, it is caused to operate in such direction as to raise the container 3 relative to its supporting trunnions 21 by means of the nut 24 and the screw 25, as hereinbefore explained. Simultaneously with the closing of the motor circuit, a holding circuit is established from the line conductor L2, through the conductor 46, the relay B, conductor 47, the operating coil of the reversing switch U, a conductor 63 that is connected, by means of the upper contact members on the reversing switch U, to a conductor 64 which leads to the upper contact members of an upper limit switch 65 and thence, by way of the conductor 50, the relay A, the conductor 51 and the conductor 45, back to the line conductor L1, thereby establishing a circuit through the operating coil of the reversing switch U which is independent of the first circuit established through the central limit switch 49.

As soon as the container 3 moves a short distance in the upward direction, a stop member 66 on the end of the cross member 23 will engage the central limit switch 49 in such manner as to open its upper contact members and close its lower contact members, as may readily be seen in the drawing; thereby opening the originally established control circuit through the reversing switch U. When the container 3 reaches the upper limit of its travel, relative to the trunnions 21, the stop member 66 on the end of the cross member 23 will engage the upper limit switch 65 in such manner as to open its upper contact members and break the self-holding circuit through the operating coil of the reversing switch U, thus permitting the reversing switch to drop out and open the circuit through the motor 29, thereby stopping it.

When the trunnions 21 of the container 3 are carried by the chains 4 to a position directly above the shaft 5, the stationary stop member 34 will engage the operating lever 32 on the controller 31, and actuate it in such manner as to open the switch 42 which de-energizes the holding coil of the relay B and permits it to drop out. When the relay B is in the out position, a circuit is established from the line conductor L2, through the conductor 46 and the lower contact members of the relay B, to a conductor 68 that leads to the operating coil of a reversing switch D and thence through a conductor 69, the lower contact members of the limit switch 65, which are now closed, the conductor 50, relay A, conductor 51 and conductor 45, to the line conductor L1.

The energization of the reversing switch D causes a circuit to be established from the line conductor L2, through the conductor 55, the armature of the motor 29, conductor 56, the contact members of the reversing switch D and thence, by means of conductor 59, through the motor field 58 and conductor 57 and the contact members of the reversing switch D, to a conductor 70 and thence to the line conductor L1. When connected in this manner, the motor 29 is caused to operate in such direction as to move the container 3 downwardly towards its central position. A secondary or holding circuit is also established through the conductor 46, lower contact members of the relay B, conductor 68, the operating coil of the reversing switch D, which is connected by a conductor 71, through upper contact members of the reversing switch D, to a conductor 72 that leads to the lower contact member of the central limit switch 49 and thence, by means of the conductor 50, relay A, the conductor 51 and conductor 45 back to the line conductor L1. As soon as the container 3 has moved downwardly a short distance, the upper limit switch 65 is engaged by the stop member 66 and moved to open its lower contact members and close its upper contact members, thereby opening the circuit which was first established through the holding coil of the reversing switch D by means of the limit switch 65. When the container 3 returns to its central or normal position, the central limit switch 49 will be engaged by the stop member 66, thereby causing its lower contact members to be opened and the holding circuit through the conductor 72 and the actuating coil of the reversing switch D to be opened, thereby permitting the reversing switch D to drop out and stop the motor 29.

When the trunnions 21 have again arrived in a horizontal plane passing through the shaft 5, the operating lever 32 on the controller 31 will be engaged by the stop 35 which will move the controller to open the switch 41, thereby disconnecting the control circuit from the line conductor L2.

As may readily be seen by referring to Fig. 1, the foregoing operation causes the uppermost container in the right-hand column to be raised relative to its trunnions in such manner that it may switch over the top of the sprocket wheel 6 without interfering with the container next below it. Then, after the car has passed the highest point in its travel, it is returned to its normal position relative to its trunnions in order that it may take its proper position in the descending left-hand column of the containers.

When the container 3 arrives at the lower end of the shaft 2, the operating lever 32 of the controller 31 will engage the stationary stop 36 that is disposed in a horizontal plane with the shaft 7, whereby the controller will be so operated as to close a switch 75 to establish a circuit from the line conductor L2, through a conductor 76, the operating coil of a relay C and, by means of the conductor 45, to the line conductor L1. The relay C establishes a circuit from line conductor L2, through the conductor 46, the lower contact members of the relay B, conductor 68, the operating coil of the reversing switch D, the conductor 69 and a conductor 77, through the lower contact members of a central limit switch 78, to a conductor 79 which leads to the relay C that connects it to a conductor 80 and thence to the conductor 45 and the line conductor L1.

As hereinbefore explained, when the operating coil of the reversing switch D is energized, the motor 29 is so connected to the line conductors L2 and L1 that it is caused to operate in a direction to move the container 3 downwardly relative to its trunnions 21. Simultaneously with starting the motor 29, a secondary or holding circuit is established from the line conductor L2, through the conductor 46, the relay B, the conductor 68, the operating coil of the reversing switch D, the conductor 71 and, through auxiliary contact members of the reversing switch D, to a conductor 81 which leads to a lower contact member on a lower limit switch 82 and thence, through the conductor 79, the relay C, the conductor 80 and the conductor 45, to the line conductor L1.

When the container 3 moves downwardly, a stop member 83, similar to the stop member 66 on the end of the cross member 23, engages the central limit switch 78 to open its lower contact members and close its upper contact members in such manner as to open the first established control circuit through the holding coil of the reversing switch D and the conductor 77.

When the container 3 reaches the lower limit of its travel, relative to the trunnions 21, the stop member 83 will engage the lower limit switch 82 to open its lower contact members and close its upper contact members, thereby breaking the secondary or holding circuit through the actuating coil of the reversing switch D and the conductor 81, whereby the reversing switch D is deenergized and the motor 29 brought to a stop. As the container 3 passes the lowest position within the shaft 2, the stationary stop member 37 will engage the operating lever 32 on the controller 31 in such manner as to close the switch 42 in addition to the switch 75, thereby energizing the relay B to cause it to lift in such manner as to open its lower contact members and close its upper contact members. With the relay B in the upper position, a circuit is established from the line conductor L2 through the conductor 46, the upper contact members of the relay B, the conductor 47, the operating coil of the reversing switch U, the conductor 48 and a conductor 84 which leads to the upper contact members on the lower limit switch 82 and thence, through the conductor 79, the relay C, the conductor 80 and the conductor 45, back to the line conductor L1. By reason of this circuit, the operating coil of the reversing switch U is energized and, as explained hereinbefore, the switch is closed to connect the motor 29 to the line conductors L2 and L1 in such manner that it will operate to move the container 3 upwardly, relative to the trunnions 21. Similarly, a holding circuit is also established from the line conductor L2, through the conductor 46, the upper contact members of the relay B, the conductor 47, the holding coil of the reversing switch U, the conductor 63, and, through contact members on the reversing switch U, to a conductor 85 that leads to the upper contact member on the centralizing limit switch 78 which is in such position as to complete the circuit through the conductor 79, the relay C, the conductor 80 and the conductor 45 to the line conductor L1.

When the container 3 moves upwardly relative to the trunnions 21, the stop member 83 engages the lower limit switch 82 to cause its upper contact members to be opened to thereby open the first established circuit through the conductor 84 and the operating coil of the reversing switch U.

When the container 3 arrives at its central position, the stop member 83 engages the centralizing limit switch 78, thereby opening its upper contact members and opening the holding circuit through the operating coil of the reversing switch U to drop out the reversing switch U and stop the motor 29. As the container 3 passes the horizontal plane of the shaft 7, the operating lever 32 on the controller 31 is engaged by the stop 38 in such manner that the switches 75 and 42 are opened, thereby again disconnecting the control circuit from the line conductor L2.

It may be readily seen, upon noting the container 3 nearest the bottom of the shaft 2 in Fig. 1, that the foregoing sequence of operation permits the bottom container of the left-hand column to move downwardly relatively to its trunnions in such manner that it may swing under the sprocket wheel 8 without interfering with the container next above it and, after it has passed its lowest position, it will be returned to its normal position relative to the trunnions 21 in order to take its place in the right-hand ascending column of containers.

From the foregoing description of my conveyor system and explanation of its operation, it may be readily appreciated that I have provided a conveyor which may be utilized for storing motor vehicles that is so designed as to utilize the available space to the best advantage.

Although I have described a specific construction and method of operation of my conveyor system, it will be readily appreciated by those skilled in the art that various modifications may be made in the general arrangement of the mechanical features and in the mechanism for controlling the movement of the containers relative to their supporting means without departing from the spirit and scope of the invention, as defined in the appended claims.

I claim as my invention:

1. A conveyor comprising a plurality of containers, means for moving the containers in synchronized relation to one another and independent means, including means operably responsive to the movement of said containers, for changing their relative positions while they are moving.

2. A storage device comprising a plurality of receptacles disposed in two substantially vertical columns, means for moving the columns of receptacles in opposite directions and independent means on each receptacle for assisting said first named means in order to transfer the receptacles from one column to the other.

3. In a conveyor comprising a chain for propelling containers, in combination, containers disposed to be moved by the chain and means, including means operably responsive to the movement of said containers, for changing their positions relative to the chain while the conveyor is moving.

4. A conveyor comprising an upper and a lower sprocket and an endless chain movable therearound, a plurality of containers supported by the chain and independent means, including means operably responsive to the movement of said containers, for changing the position of one of the containers relative to other containers on the chain while the chain is moving.

5. In an elevator system, a plurality of load receptacles, an endless flexible member for supporting and moving the load receptacles and means, including means operably responsive to the movement of said receptacles, for moving the receptacles relative to the endless flexible member while said flexible member is moving.

6. In an elevator system, a plurality of receptacles, a flexible member for moving the receptacles along a circuitous path and independent means, including means operably responsive to the movement of said receptacles, for changing the relative positions of the receptacles while they are in motion.

7. In a conveyor system, a plurality of vertically disposed endless chains, means for supporting said chains to constitute ascending and descending portions of the conveyor system, a plurality of receptacles carried by said chains, said receptacles being so suspended from the chains that they are free to assume an upright position at all times, means for driving the conveyor to cause the receptacles to follow the path defined by the chains and means on each receptacle for moving each receptacle relative to the next succeeding receptacle to provide clearance between them when changing from one portion of the conveyor system to the other.

8. An automobile-parking device comprising a plurality of receptacles for automobiles, an endless flexible element for supporting the receptacles to constitute a vertically disposed conveyor, means for permitting the receptacles to assume an upright position at all times and means, including means operably responsive to the movement of said receptacles, for adjusting the receptacles relative to the endless element while the conveyor is in motion to provide clearance between adjacent receptacles for the purpose of negotiating curves in the path of the conveyor.

9. In an automobile-parking garage, in combination, a conveyor chain, an upper and a lower sprocket wheel for the chain, trunnions carried by the chain, guide members journalled on the trunnions, automobile-storage containers carried by the guide members, a screw-and-nut mechanism in each of the guide members for changing the positions of the storage containers relative to the conveyor chain, whereby the container which is passing around a sprocket wheel may be moved out of the way of the next succeeding container.

10. An automobile-parking device comprising upper and lower sprockets, chains passing around the sprockets, trunnion bearings on the chains, trunnions for engaging the trunnion bearings, a plurality of containers for automobiles carried on the trunnions and means, including means operably responsive to the movement of said containers, for moving the containers relative to the trunnions.

11. An automobile-parking device comprising upper and lower sprocket wheels, chains passing around the sprocket wheels, trunnion bearings on the chains, trunnions for engaging the trunnion bearings, a plurality of containers for automobiles carried on the trunnions and an electric motor on each of the containers for moving it relative to the trunnions to provide clearance between adjacent containers when the chain passes around a sprocket wheel.

12. In an elevator system, a load receptacle, an endless flexible member for supporting and moving the load receptacle, and means, including means operably responsive to the movement of said receptacle, for moving the load receptacle relative to the endless flexible member.

13. In an elevator system, a load receptacle, an endless flexible member for supporting the load receptacle and moving it in a circuitous path, and means, including means operably responsive to the movement of said receptacle, for moving the load receptacle relative to the endless flexible member.

14. In an elevator system, a load receptacle, an endless flexible member for supporting the load receptacle and moving it through a circuitous path, and means, including means operably responsive to the movement of said receptacle, for moving the load receptacle relative to the endless flexible member in portions of its travel.

15. In an elevator system, a load receptacle, an endless flexible member for supporting the load receptacle and moving it through a circuitous path having curved portions, and means, including means operably responsive to the movement of said receptacle, for moving the load receptacle relative to the endless flexible member during the movement thereof through the curved portions.

16. In an elevator system, a load receptacle, an endless flexible member for supporting the load receptacle and moving it through a circuitous path, and means, including means operably responsive to the movement of said receptacle, for displacing the receptacle to either side of its normal position with respect to the endless flexible member.

17. In an elevator system, a load receptacle, an endless flexible member for supporting the load receptacle and moving it through a circuitous path, means, including means operably responsive to the movement of said receptacle, for automatically displacing the receptacle to a maximum distance on either side of its normal position with respect to said endless member and returning it thereto.

18. In an elevator system, a load receptacle, an endless flexible member for supporting the load receptacle and moving it through a circuitous path, and means including motive means and control means therefor, operably responsive to the movement of said receptacle, for automatically displacing the receptacle to a maximum distance on either side of its normal position with respect to said endless member and returning it thereto.

19. In an elevator system, a load receptacle, an endless flexible member for supporting the load receptacle and moving it through a circuitous path, and means, including means operably responsive to the movement of said receptacle, for displacing the receptacle to a maximum distance on either side of its normal position with respect to said endless member and returning it thereto during the movement of the load receptacle through a portion of its travel.

20. In an elevator system, a load receptacle, an endless flexible member for supporting the load receptacle and moving it through a circuitous path, and means, including means operably responsive to the movement of said receptacle, for displacing the receptacle to a maximum distance on either side of its normal position with respect to said endless member and returning it thereto during the movement of the load receptacle through a curved portion of its travel.

21. In an elevator system, a plurality of endless flexible members, a plurality of load receptacles normally supported therefrom in closely-spaced successive relation to each other, means, including means operably responsive to the movement of said receptacles, for displacing a receptacle to one side of its normal position with respect to the endless members and returning it thereto while moved thereby through a curved portion of the path of travel of the endless members, whereby proper clearance is obtained between successive cages.

22. In a conveyor comprising a chain for propelling containers, the combination of containers disposed to be moved by the said chain, and means, including means operably responsive to the movement of said containers, for changing the positions of the containers relative to the chain.

23. In an elevator system, a plurality of load receptacles, an endless flexible member for supporting and moving the load receptacles, and means, including means operably responsive to the movement of said receptacles, for moving the receptacles relative to the endless flexible member.

24. An automobile-parking device comprising upper and lower sprocket wheels, chains passing around the sprocket wheels, trunnion bearings on the chains, trunnions engaging the trunnion bearings, a plurality of containers for automobiles carried on the trunnions, and motive means on each of the containers for moving it relative to the trunnions.

25. An automobile-parking device comprising upper and lower sprocket wheels, chains passing around the sprocket wheels, trunnion bearings on the chains, trunnions for engaging the trunnion bearings, a plurality of containers for automobiles carried on the trunnions, motive means on each of the containers for moving it relative to the trunnions, and stationary means engageable by each container for causing said motive means to automatically move the container relative to the trunnions to provide clearance between adjacent containers when the chain passes around a sprocket wheel.

26. An automobile-parking device comprising upper and lower sprocket wheels, chains passing around sprocket wheels, trunnion bearings on the chains, trunnions for engaging the trunnion bearings, a plurality of containers for automobiles carried on the trunnions, an electric motor on each of the containers for moving it relative to the trunnions to provide clearance between adjacent containers when the corresponding trunnion bearings pass around a sprocket wheel.

27. In an automobile-parking garage, in combination, a conveyor chain, an upper and a lower sprocket wheel supporting said chain, trunnions carried by the chain, guide members journaled on the trunnions, automobile-storage containers carried by the guide members, a screw-and-nut mechanism in each of the guide members for changing the positions of the storage containers relative to the conveyor chain, and motive means on each container for actuating said screw-and-nut mechanism.

28. In an automobile-storing device, an endless flexible member, an upper and a lower means for movably supporting said endless flexible member, trunnions carried by said endless flexible member, a plurality of automobile-storage containers associatively supported from, and movable with respect to, said trunnion members, and motive means on each container for moving each container with respect to its supporting trunnions.

29. In an elevator system, a plurality of load receptacles disposed in successive relation for movement through an endless path having straight and curved portions, means for moving said receptacles, and means, independent of said moving means, operably responsive to the movement of the receptacles, for causing said receptacles to be spaced a predetermined distance during movement thereof through the straight portions of said path and for causing them to be spaced a distance different from said predetermined distance during movement thereof through the curved portions of said path.

30. In an elevator system, a plurality of receptacles, means for supporting said receptacles in succession and moving them in an endless path, means adjustably securing said receptacles to said supporting means for movement on opposite sides of a neutral position, motive means for each receptacle for adjusting it, and means for reversibly controlling each of said motive means to cause it to move a receptacle only to one side of the neutral position for one direction of rotation thereof and only to the other side of the neutral position for the opposite direction of rotation thereof.

In testimony whereof, I have hereunto subscribed my name this 2nd day of April, 1929.

WALTER S. RUGG.